US008864850B2

(12) United States Patent
Tzikas et al.

(10) Patent No.: US 8,864,850 B2
(45) Date of Patent: Oct. 21, 2014

(54) MIXTURES OF REACTIVE DYES AND THEIR USE

(71) Applicant: Huntsman International LLC, The Woodlands, TX (US)

(72) Inventors: Athanassios Tzikas, Dornach (CH); Georg Roentgen, Freiburg (DE)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 13/747,575

(22) Filed: Jan. 23, 2013

(65) Prior Publication Data

US 2013/0133142 A1 May 30, 2013

Related U.S. Application Data

(60) Division of application No. 12/711,774, filed on Feb. 24, 2010, now abandoned, which is a continuation of application No. 10/592,888, filed as application No. PCT/EP2005/051037 on Mar. 9, 2005, now abandoned.

(30) Foreign Application Priority Data

Mar. 19, 2004 (EP) .................................. 04101142

(51) Int. Cl.
*C09B 62/09* (2006.01)
*C09B 62/038* (2006.01)
*D06P 5/30* (2006.01)
*D06P 1/38* (2006.01)
*C09D 11/328* (2014.01)
*C09B 67/22* (2006.01)

(52) U.S. Cl.
CPC . *C09B 62/09* (2013.01); *D06P 5/30* (2013.01); *D06P 1/38* (2013.01); *C09D 11/328* (2013.01); *C09B 67/0058* (2013.01); *C09B 67/0057* (2013.01); *C09B 67/0044* (2013.01); *C09B 67/0042* (2013.01)
USPC ................. 8/641; 8/546; 8/549; 8/631; 8/638

(58) Field of Classification Search
USPC ...................................... 8/543–641
See application file for complete search history.

(56) References Cited

U.S. PATENT DOCUMENTS

| | | | |
|---|---|---|---|
| 4,257,770 A | 3/1981 | Nishimura et al. | |
| 5,254,136 A | 10/1993 | Fujii et al. | |
| 5,403,360 A | 4/1995 | Sutterlin et al. | |
| 5,456,728 A | 10/1995 | Schwarz et al. | |
| 5,484,458 A * | 1/1996 | Russ et al. | 8/549 |

(Continued)

FOREIGN PATENT DOCUMENTS

| | | |
|---|---|---|
| CA | 2102553 | 5/1994 |
| CA | 2132480 | 3/1995 |
| EP | 0629667 | 5/1994 |
| EP | 0905201 | 3/1999 |

Primary Examiner — Tri V Nguyen

(57) ABSTRACT

Dye mixtures comprising at least one dye of formula

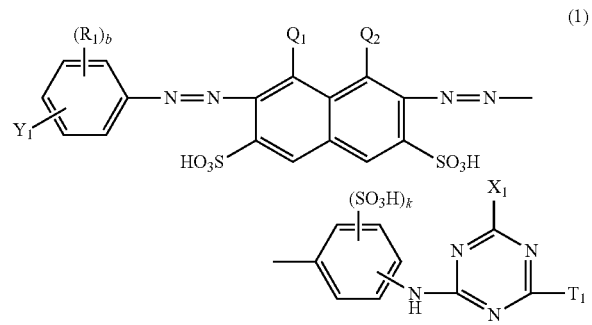

together with at least one dye from the group of formulae

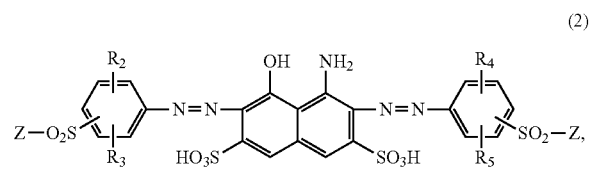

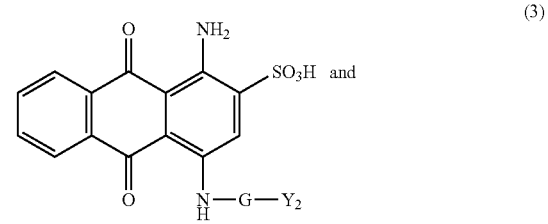

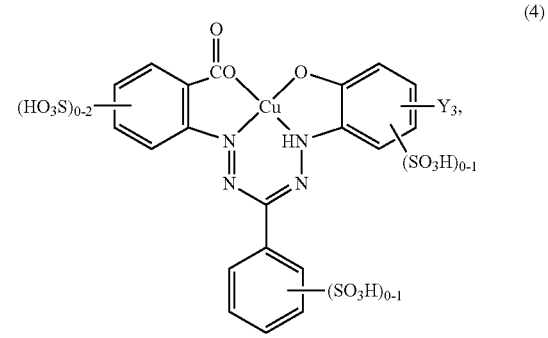

wherein the radicals have the definitions given in the claims, are suitable for dyeing or printing cellulose-containing fiber materials, while at the same time exhibiting good build-up behavior, and yield dyeings of deep shade having good fastness properties.

4 Claims, No Drawings

(56) References Cited

U.S. PATENT DOCUMENTS

| | | |
|---|---|---|
| 5,629,410 A | 5/1997 | Deitz et al. |
| 5,632,783 A | 5/1997 | Krallmann et al. |
| 5,704,951 A | 1/1998 | Negri et al. |
| 6,126,700 A | 10/2000 | Bao-Kun et al. |
| 6,319,291 B1 | 11/2001 | Pedemonte |
| 7,717,965 B2 * | 5/2010 | Tzikas et al. ............ 8/546 |
| 2004/0107517 A1 | 6/2004 | Ebenezer et al. |
| 2005/0174410 A1 | 8/2005 | Hasemann et al. |

* cited by examiner

MIXTURES OF REACTIVE DYES AND THEIR USE

This application is a divisional application of U.S. patent application Ser. No. 12/711,774, currently pending, which was a continuation of U.S. patent application Ser. No. 10/592,888, abandoned, which was the National Phase of International Application PCT/EP2005/051037 filed Mar. 9, 2005 which designated the U.S. and which claims priority to European Pat. App. No. 04101142.0 filed Mar. 19, 2004. The noted applications are incorporated herein by reference.

FIELD OF INVENTION

The present invention relates to mixtures of reactive dyes, which mixtures are suitable for dyeing or printing nitrogen-containing or hydroxy-group-containing fibre materials and yield dyeings or prints having good all-round fastness properties.

BACKGROUND OF THE INVENTION

The practice of dyeing has recently led to higher demands being made on the quality of the dyeings and the economic efficiency of the dyeing process. As a result, there continues to be a need for novel, readily obtainable dyeing compositions having good properties, especially in respect of their application.

Dyeing today requires reactive dyes that, for example, have sufficient substantivity and at the same time exhibit good ease of washing-off of unfixed dye. In addition, they should exhibit a good colour yield and a high reactivity, the objective being especially to obtain dyeings having high degrees of fixing. In many cases the build-up behaviour of reactive dyes is not sufficient to meet the demands made, especially when dyeing in very deep shades.

The problem underlying the present invention is therefore to provide novel mixtures of reactive dyes, which mixtures are especially suitable for dyeing and printing fibre materials and possess the above-described qualities to a high degree. They should also yield dyeings having good all-round fastness properties, for example fastness to light and to wetting.

SUMMARY OF THE INVENTION

The present invention accordingly relates to dye mixtures comprising at least one dye, for example one, two or three dyes, preferably one dye, of formula

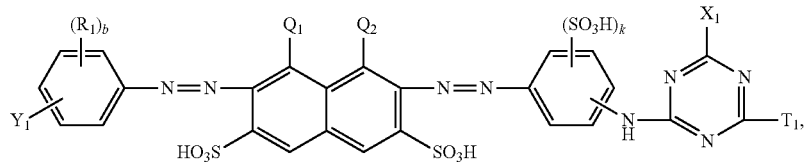

(1)

and at least one dye, for example one, two or three dyes, from the group of formulae

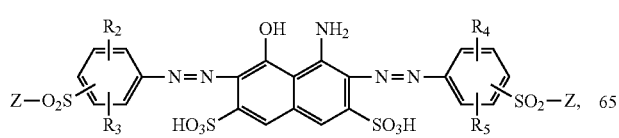

(2)

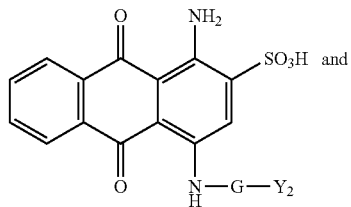

(3)

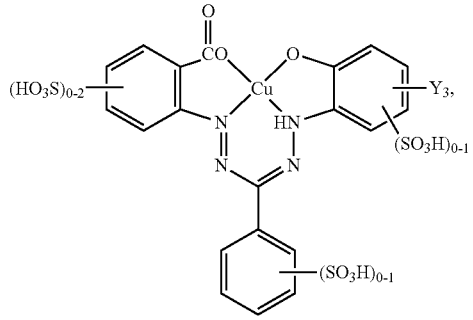

(4)

wherein
$(R_1)_b$ denotes b identical or different substituents from the group $C_1$-$C_4$ alkyl, $C_1$-$C_4$ alkoxy, sulfo and halogen,
$R_2$, $R_3$, $R_4$ and $R_5$ are each independently of the others hydrogen, $C_1$-$C_4$ alkyl, $C_1$-$C_4$ alkoxy, sulfo or halogen,
G is a phenylene radical that is unsubstituted or substituted by $C_1$-$C_4$ alkyl, $C_1$-$C_4$ alkoxy, halogen, carboxy or by sulfo, or is a cyclohexylene, phenylenemethylene or $C_2$-$C_6$ alkylene radical,
one of the radicals $Q_1$ and $Q_2$ is amino and the other of the radicals $Q_1$ and $Q_2$ is hydroxy,
$X_1$ is halogen,
$Y_1$, $Y_2$ and $Y_3$ are each independently of the others a fibre-reactive radical of formula $$-SO_2-Z \quad (5a),$$

$$-NH-CO-(CH_2)_m-SO_2-Z \quad (5b),$$

$$-CONH-(CH_2)_n-SO_2-Z \quad (5c),$$

$$-NH-CO-CH(Hal)-CH_2\text{-}Hal \quad (5d),$$

$$-NH-CO-C(Hal)=CH_2 \quad (5e) \text{ or}$$

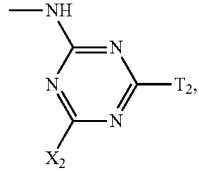

(5f)

wherein $X_2$ is halogen, $T_2$ independently has the definition of $X_2$, is a non-fibre-reactive substituent or is a fibre-reactive radical of formula

     (6a),

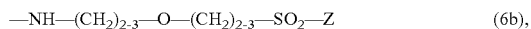     (6b),

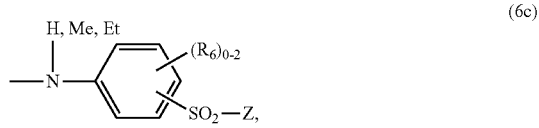     (6c)

     (6d)

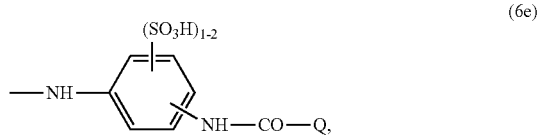     (6e)

$(R_6)_{0-2}$ denotes from 0 to 2 identical or different substituents from the group halogen, $C_1$-$C_4$ alkyl, $C_1$-$C_4$ alkoxy and sulfo, Z is vinyl or a —$CH_2$—$CH_2$—U radical and U is a group that is removable under alkaline conditions, Q is a —CH(Hal)-$CH_2$-Hal or —C(Hal)=$CH_2$ group, m and n are each independently of the other the number 2, 3 or 4, and Hal is halogen, $T_1$ is a fibre-reactive radical of the above-mentioned formula (6b), (6c), (6d) or (6e), and b and k are each independently of the other the number 0, 1 or 2.

DETAILED DESCRIPTION OF THE INVENTION

A suitable combination of at least one, two or three dyes from the group of formulae (2), (3) and (4) is, for example, one or two dyes of formula (2); one or two dyes of formula (3); or one or two dyes of formula (4); one dye of formula (2) and one dye of formula (3); one dye of formula (2) and one dye of formula (4); or one dye of formula (3) and one dye of formula (4); or one dye of formula (2), one dye of formula (3) and one dye of formula (4); preferably one dye of formula (2), one dye of formula (3), or one dye of formula (4).

As $C_1$-$C_4$ alkyl there come into consideration for $R_1$, $R_2$, $R_3$, $R_4$, $R_5$, $R_6$ and the corresponding radicals in the bridging member G, each independently of the others, for example, methyl, ethyl, propyl, isopropyl, butyl, sec-butyl, tert-butyl and isobutyl, preferably methyl and ethyl and especially methyl.

As $C_1$-$C_4$ alkoxy there come into consideration for $R_1$, $R_2$, $R_3$, $R_4$, $R_5$, $R_6$ and the corresponding radicals in the bridging member G, each independently of the others, for example, methoxy, ethoxy, n-propoxy, isopropoxy, n-butoxy and isobutoxy, preferably methoxy and ethoxy and especially methoxy.

As halogen there come into consideration for $R_1$, $R_2$, $R_3$, $R_4$, $R_5$, $R_6$ and the corresponding radicals in the bridging member G, each independently of the others, for example, fluorine, chlorine and bromine, preferably chlorine and bromine and especially chlorine.

As a $C_2$-$C_6$ alkylene radical for the bridging member G there come into consideration a branched or unbranched radical, such as, for example, 1,2-ethylene, 1,3-propylene, 1,2-propylene, 1,4-butylene, 1,3-butylene, 1,5-pentylene, 3,5-pentylene, 1,6-hexylene, 2,5-hexylene, 4,6-hexylene and the radicals of formulae

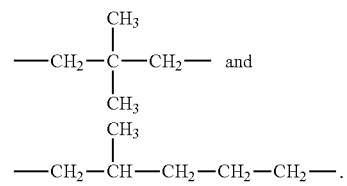

For $X_1$ and $X_2$, each independently of the other, there come into consideration, for example, fluorine, chlorine and bromine, preferably fluorine and chlorine. $X_1$ is especially chlorine.

As the leaving group U there come into consideration, for example, —Cl, —Br, —F, —$OSO_3H$, —$SSO_3H$, —OCO—$CH_3$, —$OPO_3H_2$, —OCO—$C_6H_5$, —$OSO_2$—$C_1$-$C_4$ alkyl and —$OSO_2$—N($C_1$-$C_4$ alkyl)$_2$. Preferably, U is a group of formula —Cl, —$OSO_3H$, —$SSO_3H$, —OCO—$CH_3$, —OCO—$C_6H_5$ or —$OPO_3H_2$, especially —Cl or —$OSO_3H$ and more especially —$OSO_3H$.

Examples of suitable radicals Z are accordingly vinyl, β-bromo- or β-chloroethyl, β-acetoxyethyl, β-benzoyloxyethyl, β-phosphatoethyl, β-sulfatoethyl and β-thiosulfatoethyl.

Preferably, Z is independently vinyl, β-chloroethyl or β-sulfatoethyl, especially vinyl or β-sulfatoethyl.

Preferably, $(R_1)_b$ denotes b identical or different substituents from the group $C_1$-$C_4$ alkyl, $C_1$-$C_4$ alkoxy and sulfo, especially b sulfo substituents.

Preferably, $R_2$, $R_3$, $R_4$ and $R_5$ are each independently of the others hydrogen, $C_1$-$C_4$ alkyl, $C_1$-$C_4$ alkoxy or sulfo, especially hydrogen, methyl, methoxy or sulfo.

$R_4$ and $R_5$ are especially preferably hydrogen.

$(R_6)_{0-2}$ denotes preferably from 0 to 2 identical or different substituents from the group $C_1$-$C_4$ alkyl, $C_1$-$C_4$ alkoxy and sulfo, especially methyl, methoxy and sulfo.

$R_6$ is especially preferably hydrogen.

G is preferably an unsubstituted phenylene radical or a phenylene radical substituted by $C_1$-$C_4$ alkyl, $C_1$-$C_4$ alkoxy, halogen, carboxy or by sulfo.

Preferably, $T_1$ is a radical of formula (6b), (6c) or (6d), especially of formula (6c), the definitions and preferred meanings given hereinbefore applying to the variables.

In an embodiment of interest, $T_1$ is a radical of formula

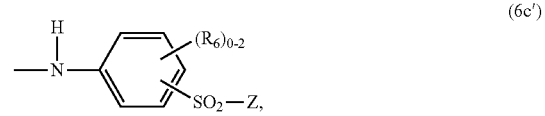     (6c')

wherein $(R_6)_{0-2}$ and Z each have the definitions and preferred meanings given hereinbefore.

$T_2$ is preferably a non-fibre-reactive substituent or a fibre-reactive radical of formula (6a), (6b), (6c), (6d) or (6e).

As a fibre-reactive radical, $T_2$ is preferably a radical of formula (6b), (6c), (6d) or (6e), especially of formula (6b), (6c) or (6d), and more especially of formula (6c), the definitions and preferred meanings given hereinbefore applying to the variables.

When $T_2$ is a non-fibre-reactive substituent it may be, for example, hydroxy; $C_1$-$C_4$ alkoxy; $C_1$-$C_4$ alkylthio unsubstituted or substituted, for example, by hydroxy, carboxy or by sulfo; amino; amino mono- or di-substituted by $C_1$-$C_8$ alkyl, wherein the alkyl is unsubstituted or is further substituted, for example, by sulfo, sulfato, hydroxy, carboxy or by phenyl, especially by sulfo or by hydroxy, and may be interrupted one or more times by the radical —O—; cyclohexylamino; morpholino; N—$C_1$-$C_4$ alkyl-N-phenylamino or phenylamino or naphthylamino, wherein the phenyl or naphthyl is unsubstituted or substituted, for example, by $C_1$-$C_4$ alkyl, $C_1$-$C_4$ alkoxy, $C_2$-$C_4$ alkanoylamino, carboxy, sulfo or by halogen and the alkyl is unsubstituted or substituted, for example, by hydroxy, sulfo or by sulfato.

Examples of suitable non-fibre-reactive substituents $T_2$ are amino, methylamino, ethylamino, β-hydroxyethylamino, N-methyl-N-β-hydroxyethylamino, N-ethyl-N-β-hydroxyethylamino, N,N-di-β-hydroxyethylamino, β-sulfoethylamino, cyclohexylamino, morpholino, 2-, 3- or 4-chlorophenylamino, 2-, 3- or 4-methylphenylamino, 2-, 3- or 4-methoxyphenylamino, 2-, 3- or 4-sulfophenylamino, 2,5-disulfophenylamino, 2-, 3- or 4-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxy.

As a non-fibre-reactive substituent, $T_2$ preferably has the definition $C_1$-$C_4$ alkoxy; $C_1$-$C_4$ alkylthio that is unsubstituted or substituted by hydroxy, carboxy or by sulfo; hydroxy; amino; N-mono- or N,N-di-$C_1$-$C_4$ alkylamino that is unsubstituted or substituted in the alkyl moiety/moieties by hydroxy, sulfato or by sulfo; morpholino; phenylamino that is unsubstituted or substituted in the phenyl ring by sulfo, carboxy, acetylamino, chlorine, methyl or by methoxy; or N—$C_1$-$C_4$ alkyl-N-phenylamino that is unsubstituted or substituted in the same way on the phenyl ring, wherein the alkyl is unsubstituted or substituted by hydroxy, sulfo or by sulfato; or naphthylamino that is unsubstituted or substituted by from 1 to 3 sulfo groups.

Non-fibre-reactive substituents $T_2$ to which special preference is given are amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, β-sulfoethylamino, morpholino, 2-, 3- or 4-carboxyphenylamino, 2-, 3- or 4-sulfophenylamino, 2,5-disulfophenylamino and N—$C_1$-$C_4$alkyl-N-phenylamino.

In the case of the fibre-reactive radicals $T_2$ of formulae (6a) and (6b), Z is preferably vinyl or β-chloroethyl. In the case of the fibre-reactive radicals $T_2$ of formulae (6c) and (6d), Z is preferably vinyl or β-sulfatoethyl.

In an embodiment of interest, $T_2$ is one of the above-mentioned fibre-reactive radicals.

Hal in the fibre-reactive radicals of formulae (5d), (5e) and (6e) is preferably chlorine or bromine, especially bromine.

Preferably, $Y_1$ is a radical of formula (5a), (5b), (5c), (5d) or (5e), especially of formula (5a), (5b) or (5c) and more especially of formula (5a), the definitions and preferred meanings given above applying to the variables.

Preferably, $Y_2$ is a radical of formula (5a) or (5f), especially of formula (5a), the definitions and preferred meanings given above applying to the variables.

Preferably, $Y_3$ is a radical of formula (5a) or (5f), especially of formula (5a), the definitions and preferred meanings given above applying to the variables. When $Y_3$ is a radical of formula (5f), $T_2$ denoting a radical of formula (6b) or (6c), especially (6b), is of interest.

b is preferably the number 1 or 2 and especially the number 1.

k is preferably the number 1 or 2 and especially the number 1.

m and n are preferably each independently of the other the number 2 or 3.

m is especially preferably the number 3.

n is especially preferably the number 2.

The dye of formula (1) is preferably a dye of formula

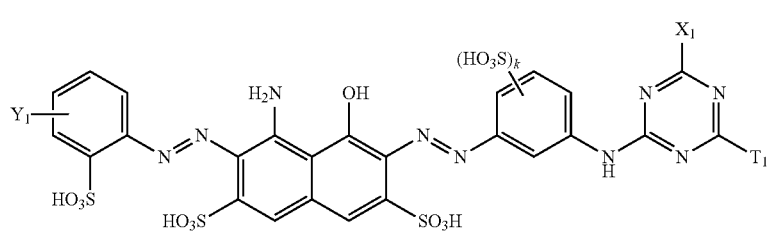

(1a)

wherein $T_1$, $X_1$, $Y_1$ and k each have the definitions and preferred meanings given above.

The dye of formula (2) is preferably a dye of formula

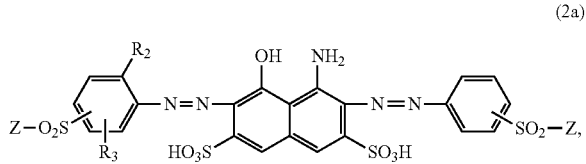

(2a)

wherein $R_2$ is hydrogen or $C_1$-$C_4$ alkoxy, preferably $C_1$-$C_4$ alkoxy, $R_3$ is hydrogen, $C_1$-$C_4$ alkyl or $C_1$-$C_4$ alkoxy, and each Z, independently, has the definition and preferred meanings given above.

$R_2$ is especially preferably methoxy.

$R_3$ is especially preferably hydrogen, methyl or methoxy, especially hydrogen.

The dye of formula (3) is preferably a dye of formula

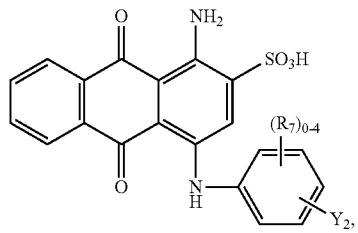

(3a)

wherein
$(R_7)_{0-4}$ denotes from 0 to 4 identical or different substituents from the group $C_1$-$C_4$ alkyl, $C_1$-$C_4$ alkoxy, halogen, carboxy and sulfo, preferably from the group $C_1$-$C_4$ alkyl, $C_1$-$C_4$ alkoxy and sulfo and
$Y_2$ has the definition and preferred meanings given above.

The dye of formula (4) is preferably a dye of formula

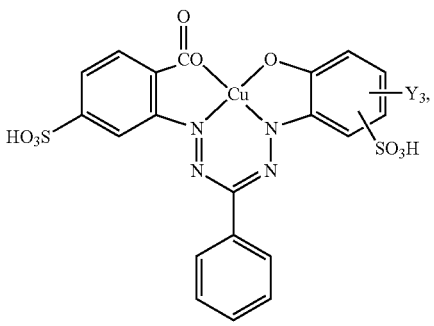

(4a)

wherein
$Y_3$ has the definition and preferred meanings given above.

A dye of formula (1) to which special preference is given is a dye of formula

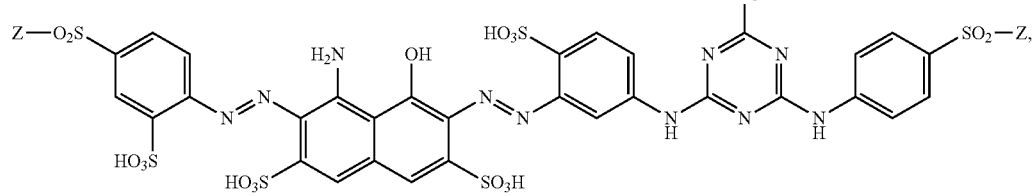

(1aa)

wherein
$X_1$ is halogen, especially chlorine, and
each Z independently has the definition and preferred meanings given above and is preferably vinyl or β-sulfatoethyl.

The dye of formula (1) is, for example, a dye of formula

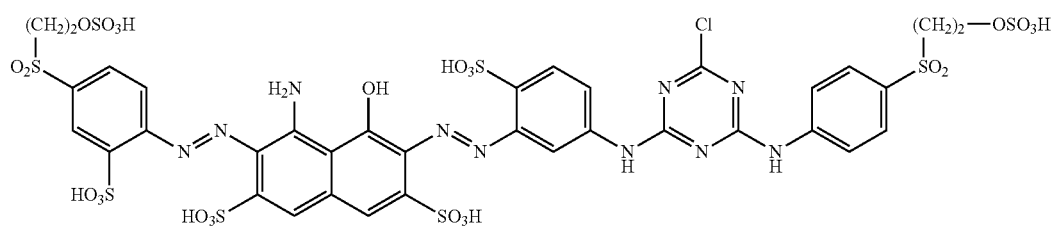

(1.1)

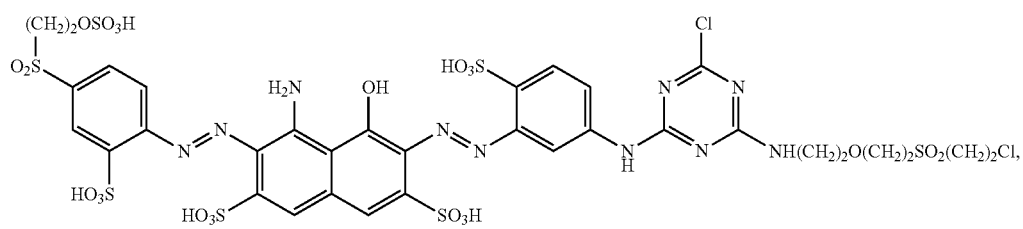

(1.2)

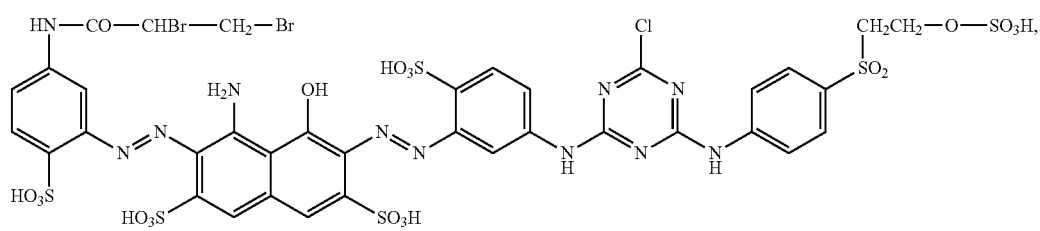

(1.3)

-continued
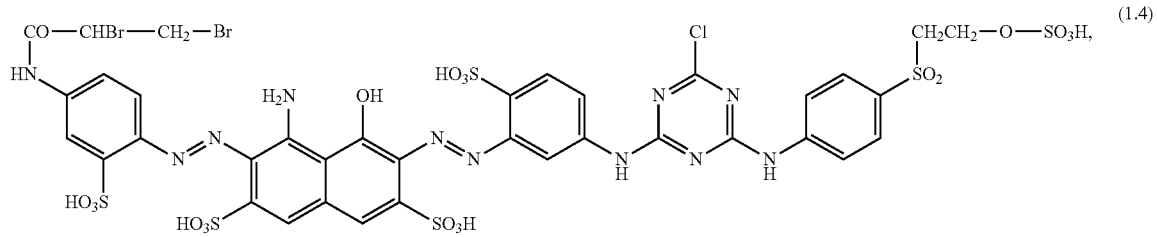
(1.4)
6
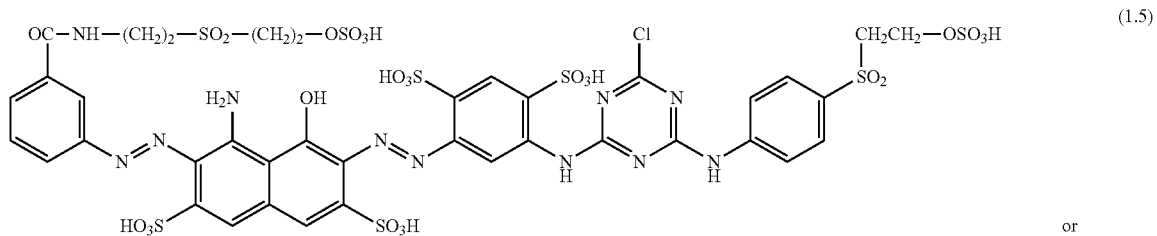
(1.5)
7
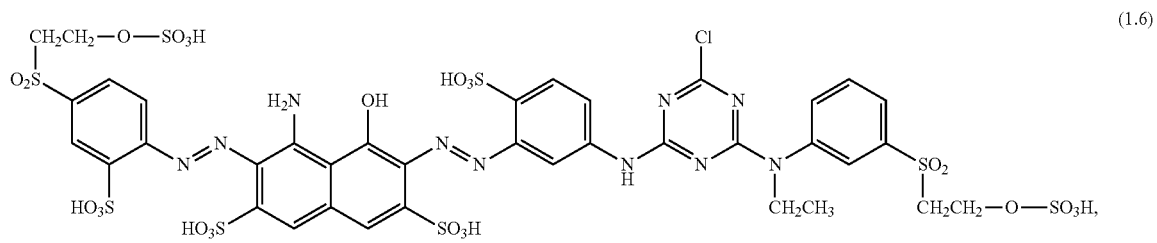
or
(1.6)
preferably of formula (1.1).
The dye of formula (2) is, for example, a dye of formula
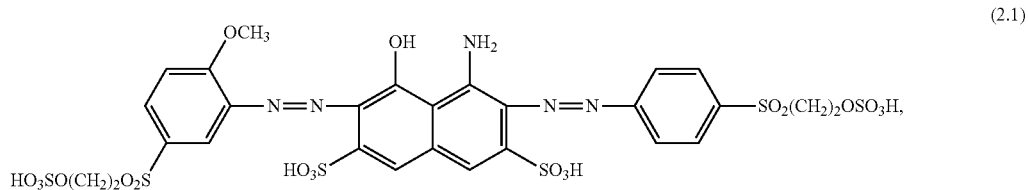
(2.1)
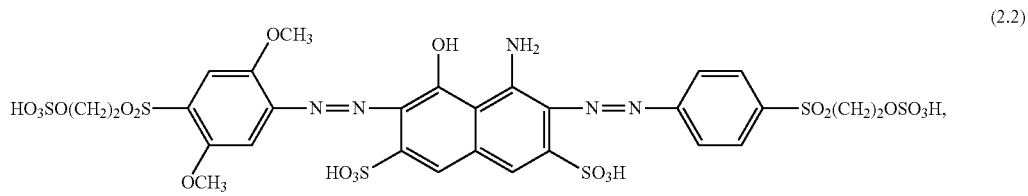
(2.2)
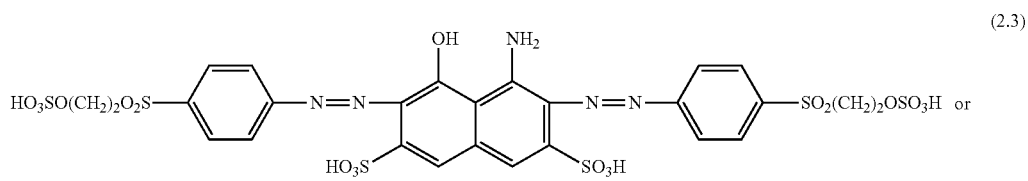
(2.3) or

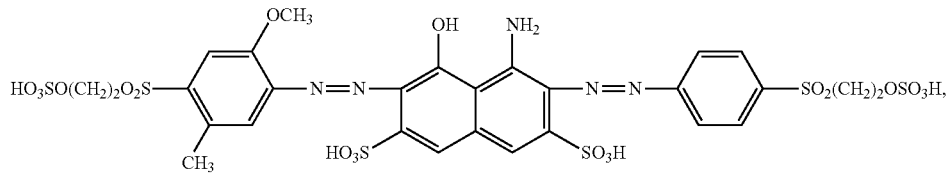
preferably of formula (2.1).
The dye of formula (3) is, for example, a dye of formula
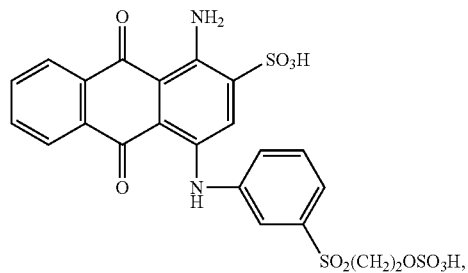
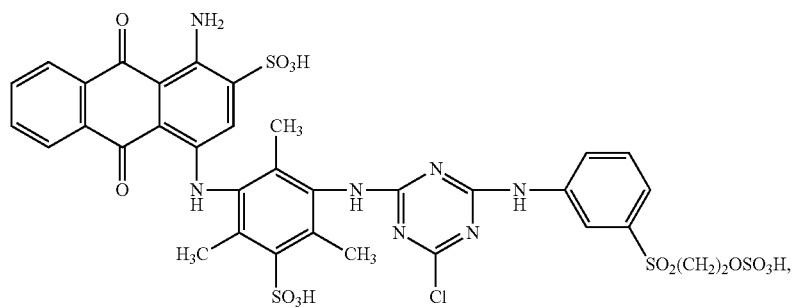
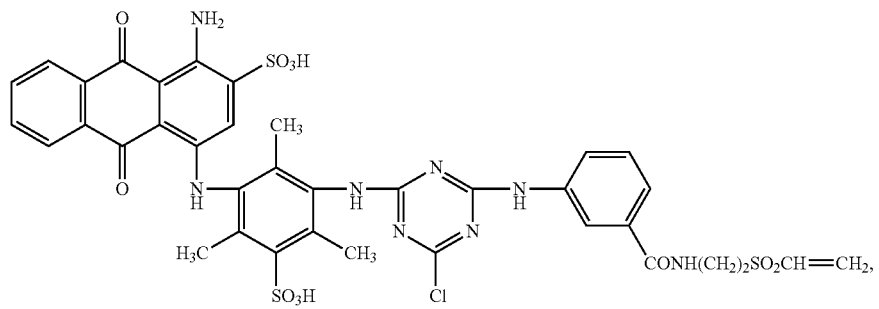
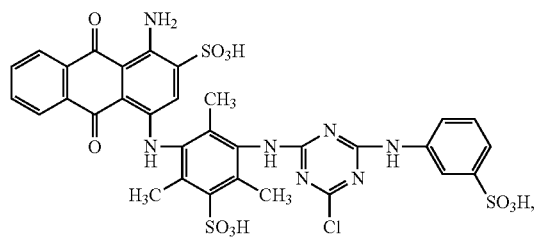
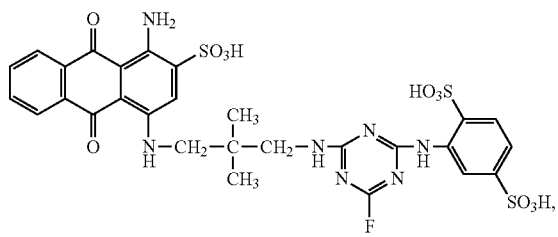

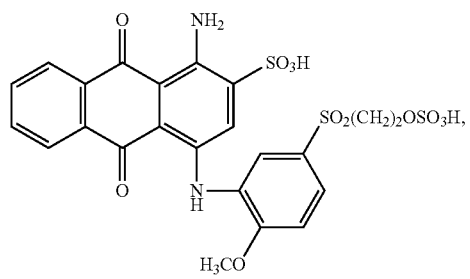 (3.6)
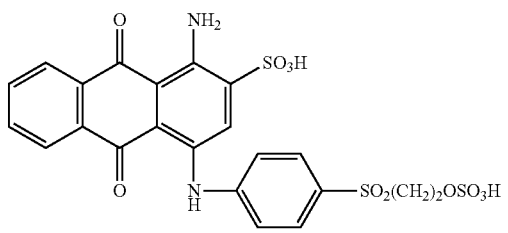 (3.7)
or
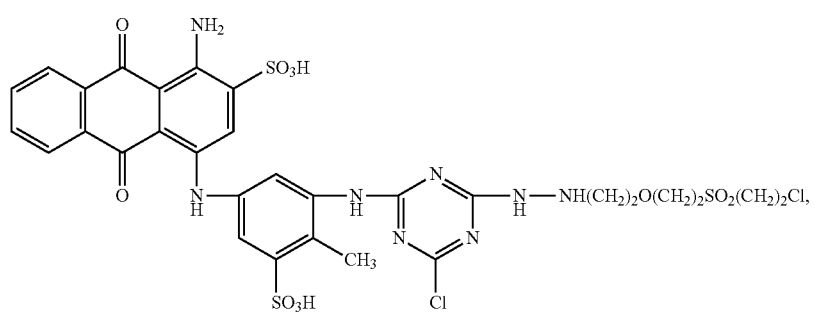 (3.8)
preferably of formula (3.1).
The dye of formula (4) is, for example, a dye of formula
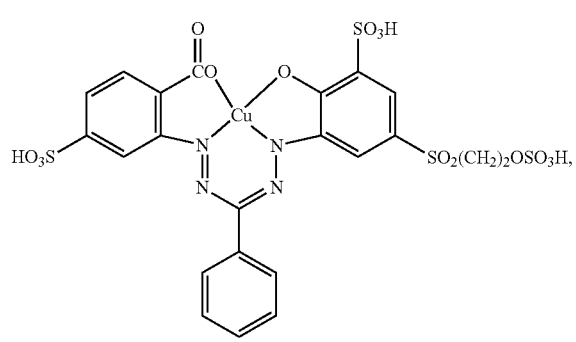 (4-1)
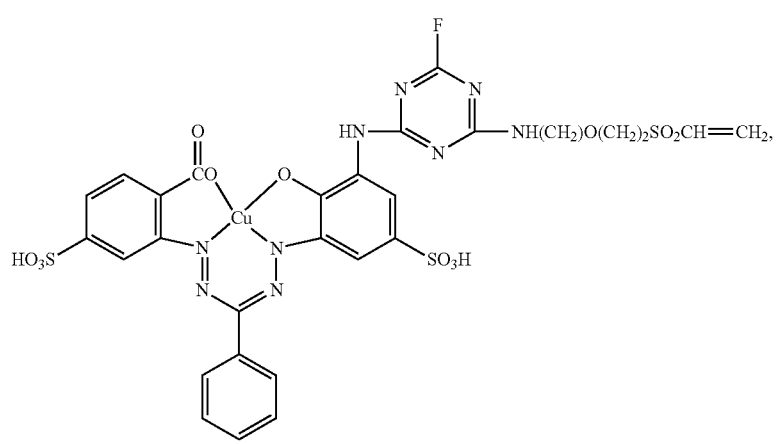 (4-2)

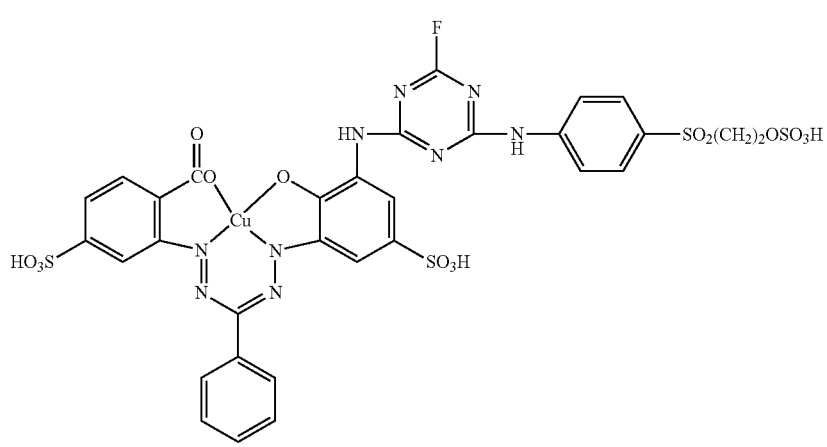

(4-3)

or

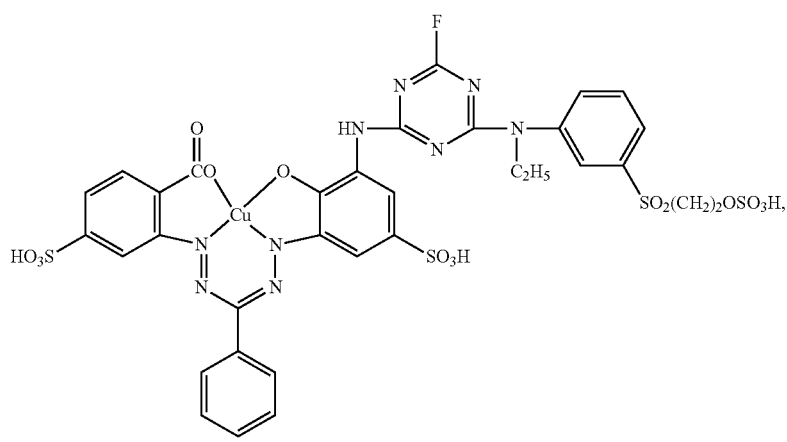

(4-4)

preferably of formula (4.1) or (4.2), especially of formula (4.1).

The reactive dyes of formulae (1) to (4) in the dye mixtures according to the invention contain sulfo groups, each of which is either in the form of the free sulfonic acid or, preferably, in the form of a salt thereof, for example in the form of the sodium, lithium, potassium or ammonium salt, or in the form of a salt of an organic amine, for example in the form of the triethanol-ammonium salt.

The reactive dyes of formulae (1) to (4), and therefore also the dye mixtures, may comprise further additives, for example sodium chloride or dextrin.

The dyes of formula (1) and the total amount of the dyes of formulae (2), (3) and (4) are present in the dye mixture according to the invention in a weight ratio of, for example, from 1:99 to 99:1, preferably from 5:95 to 95:5 and especially from 10:90 to 90:10.

The dyes of formulae (1), (2), (3) and (4) are known or can be prepared according to methods known per se. Dyes of formula (1) are described, for example, in U.S. Pat. No. 4,622,390. Dyes of formula (2) are disclosed, for example, in DE 960 534, DE 31 13 989 A1, EP 0 063 276 A2 and EP 0 122 600 A1. Dyes of formula (3) are known, for example, from U.S. Pat. No. 3,558,621, U.S. Pat. No. 4,631,341, U.S. Pat. No. 4,754,023, GB 2 034 731 A and EP 0 064 250 A1. Dyes of formula (4) are described, for example, in U.S. Pat. No. 4,336,190 and U.S. Pat. No. 4,754,023.

The dye mixtures according to the invention can be prepared, for example, by mixing the individual dyes. Such a mixing process is carried out, for example, in suitable mills, for example ball mills or pin mills, and also in kneaders or mixers.

The dye mixtures according to the invention may, where appropriate, comprise further auxiliaries that, for example, improve handling or increase storage stability, such as, for example, buffers, dispersants or anti-dusts. Such auxiliaries are known to the person skilled in the art.

The dye mixtures according to the invention are suitable for dyeing and printing an extremely wide variety of materials, especially hydroxyl-group-containing or nitrogen-containing fibre materials. Examples are paper, silk, leather, wool, polyamide fibres and polyurethanes and also especially cellulosic fibre materials of all kinds. Such fibre materials are, for example, the natural cellulosic fibres, such as cotton, linen and hemp, and also cellulose and regenerated cellulose. The dye mixtures according to the invention are also suitable for dyeing or printing hydroxyl-group-containing fibres present in blend fabrics, e.g. mixtures of cotton with polyester fibres or polyamide fibres.

The present invention accordingly relates also to the use of the dye mixtures according to the invention in the dyeing or printing of hydroxyl-group-containing or nitrogen-containing, especially cellulose-containing, fibre materials.

The dye mixtures according to the invention can be applied to the fibre material and fixed to the fibre in a variety of ways, especially in the form of aqueous dye solutions and dye print pastes. They are suitable both for the exhaust method and for dyeing in accordance with the pad-dyeing method; they can be used at low dyeing temperatures and require only short steaming times in the pad-steam process. The build-up behaviour is very good, the degrees of fixing are high and unfixed dye can be washed off easily, the difference between the degree of exhaust and the degree of fixing being remarkably small, that is to say the soaping loss is very low. The dye mixtures according to the invention are also suitable for printing, especially on cotton, but are equally suitable also for printing nitrogen-containing fibres, for example wool or silk or blend fabrics that contain wool.

The dyeings and prints produced using the dye mixtures according to the invention can be reproduced very well, have a high tinctorial strength and a high fibre-to-dye binding stability in both the acidic and the alkaline range, and furthermore have good fastness to light and very good wet-fastness properties, such as fastness to washing, to water, to sea water, to cross-dyeing and to perspiration. The dyeings obtained exhibit fibre levelness and surface levelness.

The dye mixtures according to the invention are also suitable as colorants for use in recording systems. Such recording systems are, for example, commercially available inkjet printers for paper or textile printing, or writing instruments, such as fountain pens or ballpoint pens and especially inkjet printers. For that purpose the dye mixture according to the invention is first brought into a form suitable for use in recording systems. A suitable form is, for example, an aqueous ink that comprises the dye mixture according to the invention as colorant. The inks can be prepared in customary manner by mixing together the individual constituents in the desired amount of water.

Substrates that come into consideration include the abovementioned hydroxyl-group-containing or nitrogen-containing fibre materials, especially cellulose-containing fibre materials.

The dyes used in the aqueous inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be salted out, for example, by membrane separation procedures, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. The preferred lower limit in this case is a limit of 1.5% by weight, preferably 2% by weight and especially 3% by weight.

The inks may comprise water-miscible organic solvents, for example $C_1$-$C_4$ alcohols, e.g. methanol, ethanol, n-propanol, isopropanol, n-butanol, sec-butanol, tert-butanol or iso-butanol; amides, e.g. dimethylformamide or dimethylacetamide; ketones or ketone alcohols, e.g. acetone, diacetone alcohol; ethers, e.g. tetrahydrofuran or dioxane; nitrogen-containing heterocyclic compounds, e.g. N-methyl-2-pyrrolidone or 1,3-dimethyl-2-imidazolidone, polyalkylene glycols, e.g. polyethylene glycol or polypropylene glycol; $C_2$-$C_6$ alkylene glycols and thioglycols, e.g. ethylene glycol, propylene glycol, butylene glycol, triethylene glycol, thio-diglycol, hexylene glycol and diethylene glycol; other polyols, e.g. glycerol or 1,2,6-hexane-triol; and $C_1$-$C_4$ alkyl ethers of polyhydric alcohols, e.g. 2-methoxyethanol, 2-(2-methoxyethoxy)ethanol, 2-(2-ethoxyethoxy)ethanol, 2-[2-(2-methoxyethoxy)ethoxy]ethanol or 2-[2-(2-ethoxyethoxy)ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

In addition, the inks may also comprise solubilisers, e.g. ε-caprolactam.

The inks may comprise thickeners of natural or synthetic origin inter alia for the purpose of adjusting the viscosity.

Examples of thickeners that may be mentioned include commercially available alginate thickeners, starch ethers or locust bean flour ethers, especially sodium alginate on its own or in admixture with modified cellulose, e.g. methyl cellulose, ethyl cellulose, carboxymethyl cellulose, hydroxyethyl cellulose, methyl hydroxyethyl cellulose, hydroxypropyl cellulose or hydroxypropyl methyl cellulose, especially with preferably from 20 to 25% by weight carboxymethyl cellulose. Synthetic thickeners that may be mentioned are, for example, those based on poly(meth)acrylic acids or poly(meth)acrylamides and also polyalkylene glycols having a molecular weight of e.g. from 2000 to 20 000, for example polyethylene glycol or polypropylene glycol or the mixed polyalkylene glycols of ethylene oxide and propylene oxide.

The inks comprise such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, poly-phosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mPa·s and more especially from 1 to 10 mPa·s.

Furthermore, the inks may in addition comprise customary additives, e.g. anti-foams or especially preservatives that inhibit fungal and/or bacterial growth. Such additives are usually used in amounts of from 0.01 to 1% by weight, based on the total weight of the ink.

Preservatives that come into consideration include formaldehyde-yielding agents, e.g. paraformaldehyde and trioxane, especially aqueous, approximately 30 to 40% by weight formaldehyde solutions, imidazole compounds, e.g. 2-(4-thiazolyl)benzimidazole, thiazole compounds, e.g. 1,2-benzisothiazolin-3-one or 2-n-octyl-isothiazolin-3-one, iodine compounds, nitriles, phenols, haloalkylthio compounds and pyridine derivatives, especially 1,2-benzisothiazolin-3-one or 2-n-octyl-isothiazolin-3-one. A suitable preservative is e.g. a 20% by weight solution of 1,2-benzisothiazolin-3-one in dipropylene glycol (Proxel® GXL).

The inks may also comprise further additives, such as fluorinated polymers or telomers, e.g. polyethoxyperfluoroalcohols (Forafac® or Zonyl® products) in an amount of e.g. from 0.01 to 1% by weight, based on the total weight of the ink.

In inkjet printing, individual droplets of the ink are sprayed onto a substrate in a controlled manner from a nozzle. For that purpose, predominantly the continuous inkjet method and the drop-on-demand method are used. In the continuous inkjet method, the droplets are produced continuously and any droplets not required for the printing are conveyed to a collecting vessel and recycled, whereas in the drop-on-demand method droplets are produced and printed as required, that is to say droplets are produced only when required for the printing. The production of the droplets can be effected, for example, by means of a piezo-inkjet head or by means of thermal energy (bubble jet). Printing by means of a piezo-inkjet head and printing in accordance with the continuous inkjet method are preferred.

The present invention accordingly relates also to aqueous inks comprising the dye mixtures according to the invention and to the use of such inks in an inkjet printing method for the printing of various substrates, especially textile fibre materials, the definitions and preferred meanings given above applying to the dye mixtures, the inks and the substrates.

The following Examples serve to illustrate the invention. Unless otherwise indicated, the temperatures are given in degrees Celsius, parts are parts by weight and percentages relate to % by weight. Parts by weight relate to parts by volume in a ratio of kilograms to liters.

Example 1

100 parts of a cotton fabric are introduced at a temperature of 60° C. into a dye bath containing 3.0 parts of the dye of formula (1.1), 3.0 parts of the dye of formula (2.1) and 60 parts of sodium chloride in 1000 parts of water. After 45 minutes at a temperature of 60° C., 20 parts of calcined soda are added. The temperature of the dye bath is maintained at 60° C. for a further 45 minutes. The dyed fabric is then rinsed and dried in the usual manner. A navy-blue dyeing having good fastness properties is obtained.

Examples 2 to 4

By proceeding as indicated in Example 1 but, instead of using 3.0 parts of the dye of formula (2.1), using 3.0 parts of the dye of formula (2.2), 3.0 parts of the dye of formula (2.3) or 3.0 parts of the dye of formula (2.4), there is likewise obtained a navy-blue dyeing having good fastness properties.

In a manner analogous to that described in Example 1, instead of 3.0 parts of the dye of formula (1.1), the same amount of one of the dyes of formulae (1.2), (1.3), (1.4), (1.5) and (1.6) may be used.

Example 5

100 parts of a cotton fabric are introduced at a temperature of 60° C. into a dye bath containing 3.0 parts of the dye of formula (1.1), 3.0 parts of the dye of formula (3.1) and 60 parts of sodium chloride in 1000 parts of water. After 45 minutes at a temperature of 60° C., 20 parts of calcined soda are added. The temperature of the dye bath is maintained at 60° C. for a further 45 minutes. The dyed fabric is then rinsed and dried in the usual manner. A navy-blue dyeing having good fastness properties is obtained.

Examples 6 to 11

By proceeding as indicated in Example 1 but, instead of using 3.0 parts of the dye of formula (3.1), using 3.0 parts of the dye of formula (3.2), 3.0 parts of the dye of formula (3.4), 3.0 parts of the dye of formula (3.5), 3.0 parts of the dye of formula (3.6), 3.0 parts of the dye of formula (3.7) or 3.0 parts of the dye of formula (3.8), there is likewise obtained a navy-blue dyeing having good fastness properties.

In a manner analogous to that described in Example 5, instead of 3.0 parts of the dye of formula (1.1), the same amount of one of the dyes of formulae (1.2), (1.3), (1.4), (1.5) and (1.6) may be used.

Example 12

100 parts of a cotton fabric are introduced at a temperature of 60° C. into a dye bath containing 3.0 parts of the dye of formula (1.1), 3.0 parts of the dye of formula (4.1) and 60 parts of sodium chloride in 1000 parts of water. After 45 minutes at a temperature of 60° C., 20 parts of calcined soda are added. The temperature of the dye bath is maintained at 60° C. for a further 45 minutes. The dyed fabric is then rinsed and dried in the usual manner. A navy-blue dyeing having good fastness properties is obtained.

Examples 13 to 15

By proceeding as indicated in Example 12 but, instead of using 3.0 parts of the dye of formula (4.1), using 3.0 parts of the dye of formula (4.2), 3.0 parts of the dye of formula (4.3) or 3.0 parts of the dye of formula (4.4), there is likewise obtained a navy-blue dyeing having good fastness properties.

In a manner analogous to that described in Example 12, instead of 3.0 parts of the dye of formula (1.1), the same amount of one of the dyes of formulae (1.2), (1.3), (1.4), (1.5) and (1.6) may be used.

Example 16

10 parts of a woolen fabric are dyed in a laboratory dyeing apparatus using the following liquor:
0.2 part of sodium acetate,
0.5 part of 80% acetic acid,
0.2 part of a commercially available levelling agent (Albegal B®),
0.30 part of the dye of formula (1.3),
0.30 part of the dye of formula (3.3), and
200 parts of water.

The pH of the liquor is 4.5. The textile is treated in the dye liquor for 5 min. at 40° C. and is then heated at a heating rate of 1°/min to boiling temperature (98° C.) and dyed at that temperature for 90 minutes. After cooling the liquor to 80° C., a solution of 0.8 part of sodium carbonate in 8 parts of water is added and the textile material is treated for 20 min. at 80° C. and a pH of 8.5. The dyeing is then rinsed and finished in the usual manner. A navy-blue dyeing exhibiting fibre levelness and surface levelness and having good fastness properties is obtained.

Example 17

By proceeding as indicated in Example 16 but, instead of using 0.30 part of the dye of formula (1.3), using 0.30 part of the dye of formula (1.4), there are likewise obtained navy-blue dyeings exhibiting fibre levelness and surface levelness and having good fastness properties.

Example 18

Mercerised cotton satin is pad-dyed using a liquor containing 30 g/l of sodium carbonate and 50 g/l of urea (70% liquor pick-up) and dried.

(b) Using a drop-on-demand inkjet head (bubble jet), the cotton satin pretreated according to step (a) is printed with an aqueous ink containing

- 10% by weight of a mixture of 3.0 parts of the reactive dye of formula (1.1) and 3.0 parts of the reactive dye of formula (2.1),
- 20% by weight of 1,2-propylene glycol and
- 70% by weight of water.

The print is fully dried and is fixed in saturated steam at 102° C. for 8 minutes, cold-rinsed, washed-off at boiling temperature, rinsed again and dried.

A navy-blue print having good fastness properties is obtained.

What is claimed is:

1. A dye mixture consisting of at least one dye of formula (1)

and at least one dye from the group of formulae (2)

and (4)

and optionally an additive selected from sodium chloride, dextrin, a buffer, a dispersant, an anti-dust, an organic solvent, a solubilizer, a thickener, a surfactant, a humectant, an anti-foam, a preservative, a fluorinated polymer, a telomer and a mixture thereof, wherein ($R_1$) is sulfo,
$R_2$ is $C_1$ alkoxy,
$R_3$, $R_4$ and $R_5$ are each hydrogen,
one of the radicals $Q_1$ and $Q_2$ is amino and the other of the radicals $Q_1$ and $Q_2$ is hydroxy,
$X_1$ is chlorine,
$Y_1$ and $Y_3$ are each a fibre-reactive radical of formula $$—SO_2—Z \quad (5a)$$

$T_1$ is a fibre-reactive radical of formula (6c)

Z is a $—CH_2—CH_2—U$ radical and U is a group that is removable under alkaline conditions,
b is 1,
and k is 1.

2. A dye mixture according to claim 1, wherein the dye of formula (2) is present.

3. A dye mixture according to claim 1, wherein the dye of formula (4) is present.

4. An aqueous ink comprising a dye mixture according to claim 1.

* * * * *